United States Patent Office 3,560,190
Patented Feb. 2, 1971

3,560,190
MUSHROOM NUTRIENT SUPPLEMENT
Donald H. Hughes and Hugo H. Schumacher, Jr., Cincinnati, Ohio, assignors to The Procter & Gamble Company, Cincinnati, Ohio
No Drawing. Filed Dec. 30, 1968, Ser. No. 788,080
Int. Cl. C05f 11/00
U.S. Cl. 71—5                                              7 Claims

ABSTRACT OF THE DISCLOSURE

A pre-mixed, dry, friable, granular, nutrient supplement for mushroom cultivation is disclosed, comprising cottonseed oil, cottonseed meal, and a hardwood sawdust or fuller's earth absorbent for the cottonseed oil.

BACKGROUND OF THE INVENTION

This invention relates to a pre-mixed, dry, friable, granular nutrient supplement for use in mushroom cultivation.

Definitions of terms used in the description of this invention are found in the following summary of the steps generally followed in commercial mushroom production:

(1) Composting.—This step involves the formation of the compost, which is the substratum on which the mushrooms will grow, and from which they must obtain the nutrients required for growth. Horse manure is the most commonly used composting material, having been found by experience to contain a good balance of the elements required for mushroom growth. The compost is prepared by forming the manure into a pile, where it is allowed to decompose. This decomposition causes a heating-up of the pile, resulting in a fermentation of the manure and a destruction of micro-organisms in it which are harmful to mushroom growth. At approximately five-day intervals the manure is turned over, in order to insure even fermentation throughout the pile. After about 15–20 days of composting the manure compost is ready for use.

(2) Filling and "sweating out."—At this step the compost is filled into trays where the mushrooms will be grown. This additional handling and turning of the compost causes it to heat up again in the trays, and this period of heating is called "sweating out." The "sweating out" lasts for 7–10 days during which the compost reaches a peak temperature of about 54–63° C. at the third to fifth day. After the compost in the trays cools down to about 38° C. it is ready to receive the mushroom spawn.

(3) Spawning.—This stage is comparable to seeding time for the cultivation of higher plants. Here, vigorously growing mushroom mycelium, generally purchased from a spawn laboratory, is planted in the compost tray. Nut-size pieces of spawn are planted approximately 25 cm. apart and at a depth of about 5 cm. in the tray. An alternative spawning method is to mix fine grains of spawn intimately with the entire mass of compost in the tray. In the next 15–30 days the spawn grows throughout the compost in the tray. The completion of spawning can be determined by examining the compost to see when the white filaments of mycelium have completely permeated it.

(4) Casing.—This step involves the spreading of a thin layer (about 2.5 cm.) of soil over the compost substratum when the spawning is complete. The casing soil, which is kept moist, causes the mycelium to "crop," i.e. to produce mushroom plants.

(5) Cropping.—After the first crop of mushrooms has developed and has been picked, a period of sparse growth follows, and this in turn is followed by a second crop of heavy growth. These cycles of heavy growths are known in the trade as "breaks." After the third "break," several more breaks may occur but these will generally produce mushrooms of poorer quality than those obtained in the first three, as the compost has been largely depleted of the elements essential to mushroom growth.

A more complete description of the process of mushroom cultivation can be found in the book, Mushrooms and Truffles by R. Singer, Leonard Hill Ltd., London, 1961.

It has been observed that increased yields from mushroom compost can be obtained by supplementing the compost by addition of cottonseed meal, cottonseed oil or a combination of the two. Experimental work in this area is described in the following journal articles:

(1) Experiments With Cottonseed Meal in Mushroom Culture, F. C. Stewart, New York (Geneva) Agricultural Experiment Station Bulletin 546 (1927), pp. 3–38.

(2) Nutrient Supplementation of Mushroom Compost at Casing, J. W. Sinden et al., Mushroom Science 5, pp. 267–280 (1962).

(3) Nutrient Supplementation of Mushroom Compost at Casing-Vegetable Oils, L. C. Schisler et al., Canadian Journal of Botany, vol. 44 (1966), pp. 1063–1069.

(4) Nutrient Supplementation of Mushroom Compost at Spawning, L. C. Schisler et al., Mushroom Science 5, pp. 150–164 (1962).

(5) Stimulation of Yield in the Cultivated Mushroom by Vegetable Oils, L. C. Schisler, Applied Microbiology, July 1967, pp. 844–850.

Cottonseed meal which is the dry residue from the expression and extraction of oil from cottonseed, contains about 8–9% nitrogen, of which about 90% is in the form of protein. The amino acids which comprise this protein are the prime nutrients which cottonseed meal provides for mushroom growth. Mushrooms are incapable of producing sufficient amounts of their own amino acids and therefore must obtain them from the substratum on which they grow. Supplementation of the substratum with cottonseed meal, therefore, increases the supply of these essential amino acids in the substratum. The reason for the beneficial effect which cottonseed oil has on mushroom growth is not so well understood. It has been postulated that the small quantities of hormones, or perhaps other minor components present in the oil act somehow as reproduction initiators for the mushroom.

Cottonseed meal and cottonseed oil both have the effect of yielding a larger number of mushrooms per square meter of substratum, but do not materially increase the size of the mushrooms. The combination of cottonseed meal and oil appears to be synergistic, in that mushroom yields obtained with the combination are generally greater than would be expected from the sum of the effects of the two materials individually.

Cottonseed meal and oil can be added to compost at spawning or at casing, but best yields are obtained when the addition is at casing. When these nutrients are added at spawning, the relatively slow growing mushroom mycelium must compete for them with faster growing molds and assorted micro-organisms which may be present in the compost, with the net result that the mushroom does not derive full benefit from the added nutrients. If, however, the nutrients are added at casing, when the mycelium has developed fully in the compost, maximum utilization of the nutrients by the mushroom plant is obtained.

In an experiment reported in reference 5 (supra), trays containing 25–28 kg. of compost and having a cultivation area of 0.37 square meter, were supplemented at casing with 500 grams of cottonseed meal plus 400 ml. of cottonseed oil. The average yield in these trays was approximately 40% higher than in comparable trays which did not receive the supplement.

THE INVENTION AND ITS OBJECTS

The object of this invention is to provide a dry, friable, pre-mixed granular nutrient supplement composition for mushroom cultivation, comprising cottonseed oil and cottonseed meal, which can be conveniently added to mushroom compost. Such a composition has handling and ease-of-mixing advantages for the mushroom grower, compared to purchasing the ingredients separately and mixing them into this compost. Achieving a uniform distribution of cottonseed oil in compost is particularly difficult when the oil is added separately to the compost. The composition which fulfills the objects of this invention comprises cottonseed oil absorbed onto a porous material, admixed with cottonseed meal.

To obtain best nutritive results the weight ratio of oil to meal must be in the range of 2:1 to 0.5:1, and preferably it should be in the range of 1.5:1 to 1:1. Cottonseed meal does not readily absorb cottonseed oil, and therefore a straight mixture of the tow is not dry and friable. In order to obtain the dry friable composition of this invention it has been found necessary to employ a third material to absorb the oil. The amount of absorbing material must be between 1 and 3 times the weight of the oil, and preferably should be from 1 to 2 times the weight of the oil. The mixture of oil and absorbent forms a slightly oily mass which, when the meal is admixed with it, becomes a light amber colored, dry, friable granular composition which can be easily handled, packed and shipped, and which can be conveniently mixed into the mushroom compost by the user.

Absorbents which have been found to be useful in this invention are hardwood sawdust, i.e., sawdust from angiospermous trees (for example, maple, oak and poplar), and fuller's earth. Sawdust from soft woods, i.e., conifers, is not suitable because it contains resins which can be harmful to the mushroom mycelium. The preferred particle size for the absorbent is in the range of 4.76 to 2.38 mm. (4–8 mesh, U.S. Standard Sieve), although an acceptable dry, friable product can be obtained with sawdust having a particle size between 8 mm. and 1 mm. (5/16 in. to 18 mesh) and fuller's earth having a particle size between 8 mm. and 1.68 mm. (5/16 in. to 12 mesh). Particles within the 4–8 mesh range are preferred because they have sufficient surface area per unit mass to give good absorption of the oil, and at the same time they form the base for a finished nutrient composition which has large enough particle size to enable the user to easily determine if he has achieved a uniform mixing of the nutrient into the compost. Absorbent particle sizes larger than 4 mesh are less preferred because of their low surface area/mass ratio. This factor is important from the standpoint of producing a dry, friable product with the minimum amount of absorbent, and from the standpoint of efficient distribution of the nutrient throughout the compost. Particle sizes smaller than 8 mesh are less preferred because of the relative difficulty in visually determining whether or not the particles of nutrient are evenly mixed into the compost. In using fuller's earth it is especially important not to use a particle size smaller than 12 mesh, since it has been found that cottonseed oil/cottonseed meal mixtures made with fuller's earth of particle size less than 12 mesh support spontaneous combustion. This combustion problem has not been found in the case of sawdust of the above particle sizes.

The compositions of this invention can be prepared in the following manner. The absorbent is thoroughly mixed into cottonseed oil at ambient temperature, resulting in a slightly oily mass. Dry cottonseed meal is then mixed into this mass. Most of the meal becomes absorbed onto the particles of absorbent, thus reducing or eliminating oiliness and resulting in a dry, friable, granular product.

The preparation and usefulness of the compositions of this invention is further demonstrated by the following examples:

EXAMPLE I 10 pounds of cottonseed oil was thoroughly mixed with 10 pounds of poplar sawdust having a particle size between 4.76 and 2.38 mm. (i.e. through 4 mesh and on 8 mesh U.S. Standard Sieve). The mixture was slightly oily to the touch. 10 pounds of cottonseed meal was then added slowly and was thoroughly blended into the oily sawdust. After the blending in of the cottonseed meal the mixture possessed a slightly damp appearance but was granular and friable.

This dry, friable, granular mixture, referred to hereinafter as "supplement," was tested to determine its effect on mushroom growth in the following manner. Five trays which contained 55 pounds each of compost and which had been spawned with the mycelium of mushroom species *Agaricus bisporous*, were supplemented at casing with 2.25 lbs. of supplement per tray by mixing the supplement evenly throughout the compost. The point at which thorough mixing was attained was easily determined by observing the distribution of the supplement particles in the compost. A second set of five trays, identical to the first, was supplemented with 3.00 lbs. of supplement per tray. A third set of five trays, identical to the first was given no supplement. A record was kept of the weight of mushrooms harvested from these trays during the nine weeks following casing. The trays without supplement yielded an average of 1.88 pounds per square foot. The trays with 2.25 lbs. of supplement yielded an average of 2.41 pounds per square foot (a 28% increase over no supplement) and the trays supplemented with 3.00 pounds of supplemen yielded an average of 2.84 pounds per square foot (a 51% increase over no supplement).

EXAMPLE II 10 pounds of cottonseed oil was thoroughly mixed with 10 pounds of oak sawdust having a particle size between 4.76 and 2.38 mm. (i.e., through 4 mesh and on 8 mesh U.S. Standard Sieve). The mixture was slightly oily to the touch. 10 pounds of cottonseed meal was then added slowly and was thoroughly blended into the oily sawdust. After the blending in of the cottonseed meal, the mixture possessed a slightly damp appearance but was dry, granular and friable. When used as a mushroom nutrient supplement, this mixture gives increases in mushroom yield similar to those obtained with the supplement made in Example I.

Comparable results are also obtained if the supplement is made using the sawdust of other angiospermous trees, for example maple, locust or beech.

EXAMPLE III 10 pounds of cottonseed oil were thoroughly mixed with 10 pounds of fuller's earth having a particle size between 4.76 and 2.38 mm. (i.e. through 4 mesh and on 8 mesh U.S. Standard Sieve). The mixture was slightly oily to the touch. 10 pounds of cottonseed meal was then added slowly and was thoroughly blended into the oily mixture. After the blending in of the cottonseed meal, the mixture possessed a slightly damp appearance but was dry, granular and friable. When used as a mushroom nutrient supplement, this mixture gives increases in mushroom yield similar to those obtained with the supplement made in Example I.

What is claimed is:

1. A pre-mixed, dry, friable, granular nutrient supplement for mushroom cultivation comprising cottonseed oil, cottonseed meal and an absorbent for the cottonseed oil, wherein the weight ratio of oil to meal is in the range of 2.1 to 0.5:1 and the weight ratio of oil to absorbent, in the range of 1:3 to 1:1, said absorbent being selected from the group consisting of hardwood sawdust having a particle size between 8 mm. and 1 mm., and fuller's earth having a particle size between 8 mm. and 1.68 mm.

2. The composition of claim 1 wherein the absorbent is selected from the group consisting of hardwood sawdust and fuller's earth, each having a particle size between 4.76 and 2.38 mm.

3. The composition of claim 2, wherein the hardwood sawdust is poplar.

4. The composition of claim 2, wherein the hardwood sawdust is oak.

5. The composition of claim 3, wherein the ratio of cottonseed oil/cottonseed meal/poplar sawdust is 1/1/1.

6. The composition of claim 4, wherein the ratio of cottonseed oil/cottonseed meal/oak sawdust is 1/1/1.

7. The composition of claim 2, wherein the absorbent is fuller's earth and the ratio of cottonseed oil/cottonseed meal/fuller's earth is 1/1/1.

References Cited

Schisler: Applied Microbiology, "Stimulation of Yield in the Cultivated Mushroom by Vegetable Oils," vol. 15, No. 4, July 1967, pp. 844–850.

REUBEN FRIEDMAN, Primary Examiner

C. N. HART, Asssistant Examiner

U.S. Cl. X.R.

71—23, 25; 47—1.1